May 7, 1968   F. J. BOWES   3,382,327
HEARING AID EYEGLASS FRAME
Filed May 7, 1965
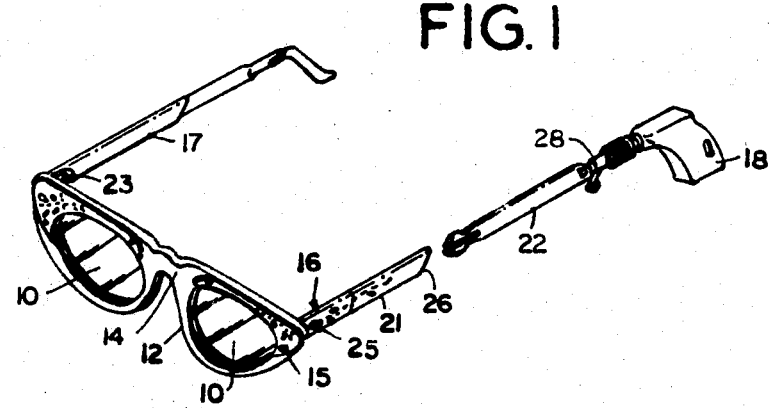
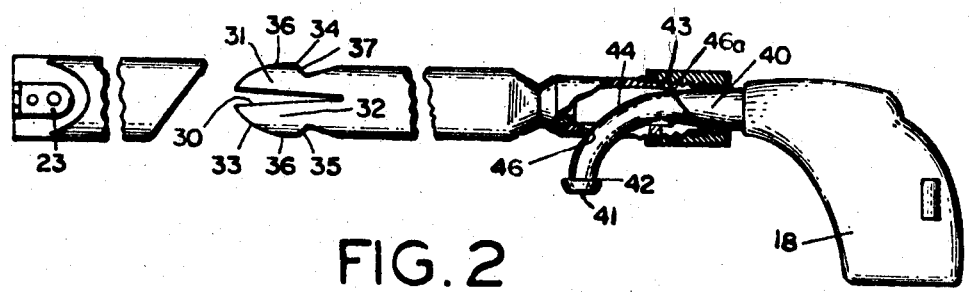
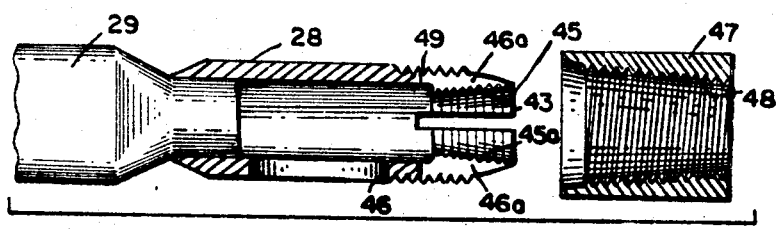
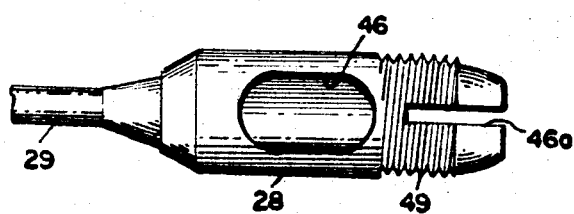
INVENTOR
FRANCIS J. BOWES
BY Wolf, Greenfield & Hicken
ATTORNEYS United States Patent Office 3,382,327
Patented May 7, 1968

3,382,327
HEARING AID EYEGLASS FRAME
Francis J. Bowes, Winchester, Mass., assignor to Non-Slip Temple Company, Inc., Holliston, Mass., a corporation of Massachusetts
Filed May 7, 1965, Ser. No. 454,014
8 Claims. (Cl. 179—107)

This invention relates to an eyeglass frame temple assembly and more particularly comprises a new and improved coupling means for adjustably connecting the ear piece to the temple. This invention has particular application to hearing aid eyeglass frames of all types.

At the present time hearing aid eyeglass frames are often formed with the hearing aid piece as an integral part of the temple and with such frames the aid cannot be transferred from one pair of glasses to another. Recently, hearing aid manufacturers have devised different methods of separately manufacturing hearing aid cases and attaching them to the temple so as to allow the transfer of the aid and to make it fit the wearer more comfortably. However, it has been extremely difficult to provide a coupling device structure and assembly which enables a wide range of adjustment to the ear of a user and allows firm tightening of the aid case to the temple so that it will not subsequently loosen.

One important object of this invention is to provide a coupling device for hearig aid eyeglasses which enables the ear piece to be adjustable into a wide variety of positions on the temple, and once adjusted, to be tightened so that it does not later become loose except by the direct and intentional act of the wearer.

Another important object of this invention is to provide a relatively low cost coupling device between the hearing aid case and temple of a hearing aid eyeglass frame which is leak proof and accordingly free of all feedback or extraneous noise sources.

To accomplish these and other objects the eyeglass frame of the present invention includes among its features a temple assembly preferably having a substantially cylindrical rear end. An elongated bore is defined by the temple and has a first opening at the rear end and a second opening at a point on the temple spaced from the extreme rearmost portion of the end. A plurality of substantially axially extending slots are provided in the rear end and extend through the wall thereof to the bore enabling the rear end to be compressed. External threads are provided on the rear end and a sleeve is screwed onto the external threads. The sleeve has an internal diameter which diminishes in one direction with the smallest internal diameter of the sleeve being less than the uncompressed outer diameter of the rear end of the temple. An ear piece is provided carrying a fixed forwardly extending tube. The tube is positioned in the bore and has a tube end extending outwardly of the second opening with the sleeve locking the tube and said ear piece in position by compressing said rear end into engagement with the tube.

Preferably the tube of the ear piece is funnel shaped and the inner bore of the rear end is correspondingly funnel shaped to receive the tube in close proximity thereto. The inner surface of the bore is preferably provided with frictional engaging means and may actually bite into the tube to hold it firmly in position. The tube preferably extends forwardly of the ear piece and then downwardly with the downward extension lying substantially in the same plane as the plane of the ear piece.

These and other objects and features of this invention along with its incident advantages, will be better understood and appreciated from the following detailed description of one embodiment thereof, selected for purposes of illustration and shown in the accompanying drawings in which:

FIG. 1 is a perspective view showing a hearing aid eyeglass frame constructed in accordance with this invention;

FIG. 2 is a side view of the temple assembly of the frame of FIG. 1;

FIG. 3 is an exploded detailed view partly in section, of the temple assembly of FIG. 2; and, FIG. 4 is a bottom view thereof.

The eyeglass frame shown in FIG. 1 includes conventional lenses 10 enclosed in a frame 12 having a bridge 14, decorative plates 15, and bows or temples 16 and 17. While the temple assembly shown includes a separate fore temple and a rear temple, the invention is not limited to that construction and the fore temple and rear temple can be combined into a unitary non-adjustable structure or other adjustable structures can be employed.

In the embodiment of the temple shown in FIG. 1 a fore temple 21 and a rear temple 22 is provided. In order to simplify the description only temple 16 will be discussed in detail, although temple 17 is substantially similar except for its conventional ear piece. The fore temple 21 carries at its forward end a flat portion for positioning a hinge plate 23 of a conventional hinge adapted to mate with a similar hinge member not shown on the rear of the lens frame 12 to secure the fore temple to the lens frame. The fore temple is preferably formed from a tube which is flattened into a generally oval shape. Since there is not opening to the elongated recess (not shown) defined by the tube of the fore temple 21, dirt, dust and other find matter cannot enter. Moreover, the flattened tubular shape closely simulates known temple shapes and is pleasing to the eye. The esthetic appearance of the temple can be enhanced by the use of decorative means such as engravings 25 shown in FIG. 1.

The rear end of the fore temple is cut defining an end 26 which is non-perpendicular to the axis of the tubular fore temple 21.

Preferably the fore temple 21 or tubular member of the temple is formed of a thin metallic tube which is partially flattened. Aluminum is particularly suitable although other metals or plastics can be used.

The rear temple 22 has a rear ear piece comprising a hearing aid attachment 18 and is preferably formed from a thin gage metallic tube similar to the material for temple 21 or having a hardness value slightly greater than that of the fore temple. The rear temple 22 has a rear portion 28 having a circular cross-section with a forward portion 29 having a flattened or oval cross-section with the outer circumference just slightly less than the inner circumference of the recess of the fore temple 21. Thus, portion 29 snugly and slidably fits within the recess of the fore temple 21.

At the forward end of portion 29 is a longitudinal slit 30 along a substantial portion of the length thereof to divide the slide portion 29 into a pair of arms 31 and 32. The slit 30 provides resiliency in the slide by permitting the arms 31 and 32 to be compressed towards one another under load. End 33 of the slide is preferably rounded to facilitate insertion of the slide into the recess and is preferably provided with upper and lower biting detents 34 and 35. The detents 34 and 35 have flat outer portions 36 with sharp angle surfaces 37 meeting therewith on one side and the rounded point 33 meeting therewith on another side. In use, the arms 34 and 35 are preferably biased and spread apart so that flat surfaces 36 extend beyond the upper and lower surfaces of the slide 29. Thus when the slide 29 is inserted into the tubular fore temple 21 as best shown in FIG. 1, the arms are resiliently compressed and are biased against the upper and lower wall portions of the recesses formed in the tubular fore temple 21. This frictional fit tends to positively position the temple sections together.

The hearing aid case 18 may have any conventional form for an ear piece hearing aid case as is known in the art. Preferably the curved generally rectangular form shown in FIG. 1 is preferred. The case 18 has at its upper end an integral sound tube 40 which extends forwardly of the ear case 18 in a generally funnel-like shape with a downwardly projected forward end 41. The forward end 41 is preferably provided with a circular projection 42 for attachment of the ear tube of a flexible pipe and receiver (not shown) that fits into the ear. The hearing aid case carries a conventional amplifier (not shown) which directs sound to and through a central passageway in the hollow tube 40. It should be noted that the present construction prevents any transmission of sound through the passageway 44 to the flexible pipe, the sound tube 40 and the hearing aid components. The tube 40 is preferably integrally attached to the hearing aid case 18 by mechanical means, integral molding or adherence with the ear case.

The rear end portion of the rear temple illustrated at 28 has a rear end edge 43 transverse to the axis of the temple. A bore 44 extends axially of the temple and has a funnel shaped mouth portion 45 adapted to receive the funnel shaped portion of the sound tube 40. The rear end portion can comprise a sleeve member as shown welded or otherwise attached to the rear end of the rear temple 22 or can be an integral extension of the tube 30 forming temple 22. The funnel shaped portion 45 is preferably serrated as best shown in FIG. 3 at 45a to provide a cutting and biting surface as will be further described.

At a point spaced from the end edge 43 of the rear end is an opening 46 which has a greater area than the cross-sectional area of the sound tube 40 at the point where it passes through the opening. Thus, when the sound tube 40 is inserted into the temple, with the end 41 and case 18 lying substantially in a plane, the case and tube can be adjusted with respect to the end 28 and moved through an angle of a circle perpendicular to and having a center coincident with the axis of the temple. This adjustment is important to provide for proper adjustment of the ear piece hearing aid case to the ear and head of a user.

A sleeve 47 fits over the rear end of the rear temple and carries an internal thread 48 which mates with the external thread 49 of the circular rear end. The sleeve has an internal diameter which diminishes in rearward direction with the smallest diameter of the sleeve being less than the uncompressed outer diameter of the rear end of the temple. Thus as the sleeve 47 is screwed onto the threads 49 the rear innermost surface pushes against the projecting fingers formed by the elongated slots 46a and moves them radially inwardly so that the funnel surface 45 contacts and frictionally engages the sound tube 41 to lock it in position. The serrations 45a or other frictional engaging means provided on the inner surface of the temple member are caused to bite into the sound tube 40 in the preferred form of the invention.

After the sleeve 47 is locked in position as shown in FIG. 2 the eyeglasses may be used. To adjust the hearing aid case to the head of a wearer, the sleeve 48 may be loosened or removed from the threads 49 while the case is adjusted after which the sleeve is locked in place again.

Preferably the rear end of the temple member is a metallic material having sufficient resiliency to allow the rear end portions carrying the elongated slots 46a to move inwardly under pressure and spring back to their original position when the pressure of the sleeve 48 is removed. In some cases plastic materials may be used. The sound tube 40 is preferably a plastic such as polyethylene or polypropylene into which the serrated surface of the rear end can easily cut. However, it is also possible to form this tube of metal.

While a specific embodiment of this invention has been shown and described, it should be understood that many variations thereof are possible within the scope of this invention. For example, the particular shape of the hearing aid ear case may vary. In some cases the funnel shape for the sound tube may be replaced with a generally cylindrical tube although better gripping action is achieved by the use of the funnel.

This invention is to be limited only by the spirit and scope of the appended claims.

What is claimed is:

1. A temple assembly for an eyeglass frame comprising,
   a temple substantially cylindrical at its rear end,
   an elongated bore defined by said temple and having a first opening at said rear end with a second opening at a point on said temple spaced from said rear end,
   a plurality of substantially axially extending slots provided in the rear end and extending through the wall thereof to said bore enabling said rear end to be compressed,
   external threads provided on said rear end,
   a sleeve screwed onto the external threads of said rear end of said temple and having an internal diameter which diminishes in rearward direction, the smallest internal diameter of said sleeve being less than the uncompressed outer diameter of said rear end of said temple,
   a hearing aid ear piece carrying a fixed forwardly extending tube,
   said tube of said ear piece being positioned in said bore and having a tube end extending outwardly of said second opening with said sleeve locking said tube and said ear piece in position.

2. A temple assembly in accordance with claim 1 wherein said hearing aid ear piece carries a fixed forwardly and downwardly extending tube, and said tube end extends outwardly and downwardly of said temple.

3. A temple assembly in accordance with claim 1 wherein said elongated bore defined by said temple is funnel shaped at said rear end.

4. A temple assembly in accordance with claim 1 wherein said elongated bore at said rear end carries a plurality of frictional engaging means for engaging said tube of said hearing aid ear piece.

5. In a temple assembly comprising a temple substantially cylindrical at its rear end, an elongated bore defined by said temple and a first and second opening through said temple to said bore,
   the improvement comprising a curved sound tube integrally attached to a hearing aid case forming an ear piece,
   said sound tube passing into said first opening and having an end adapted to be connected to hearing aid means and passing out of said second opening.

6. The improvement of claim 5 wherein a cylindrical sleeve is provided threadably engaged with said temple rear end causing said temple rear end to engage and firmly position said sound tube.

7. The improvement of claim 5 wherein said second opening has a cross-sectional area greater than the outer diameter of said sound tube at said opening whereby said sound tube and hearing aid case can be properly positioned with respect to said temple to fit the ear and head of a user.

8. An eyeglass temple assembly comprising front and rear sections joined together,
   one of said sections having a wall defining an axially extending recess having a continuous encircling cross-section, the other of said sections comprising an elongated slide constructed and arranged to be snugly received and slide within said recess, said slide having a slit extending longitudinally thereof dividing the slide into upper and lower spring-like portions, said spring-like portions carrying detents for biting into portions of said recess wall to retain said sections together, said rear section being substantially cylindrical at its rear end, an elongated bore defined by said rear section and having a first opening at said rear end with a second opening at a point on said rear section spaced from said rear end, a plurality of substantially axially extending slots provided in the rear end and extending through the wall thereof to said bore enabling said rear end to be compressed, external threads provided on said rear end, a sleeve screwed into the external threads of said rear end of said rear section and having an internal diameter which diminishes in rearward direction, the smallest internal diameter of said sleeve being less than the uncompressed outer diameter of said rear section, a hearing aid ear piece carrying a fixed forwardly and downwardly extending tube, said tube of said ear piece being positioned in said bore and having a tube and extending outwardly of said second opening with said sleeve locking said tube and said ear piece in a selected position.

No references cited.

KATHLEEN H. CLAFFY, *Primary Examiner.*

A. A. McGILL, *Assistant Examiner.*